United States Patent [19]

Ruehl

[11] Patent Number: 4,582,288

[45] Date of Patent: Apr. 15, 1986

[54] CABLE ROUTING DEVICE WITH COOPERATING PIN AND BORE

[75] Inventor: William E. Ruehl, Wheeling, Ill.

[73] Assignee: Illinois Tool Works Inc., Chicago, Ill.

[21] Appl. No.: 399,026

[22] Filed: Jul. 16, 1982

[51] Int. Cl.[4] .............................................. H02G 3/26
[52] U.S. Cl. .................................. 248/547; 248/548; 248/71; 248/216.1; 174/159; 174/165; 174/166 R; 411/546
[58] Field of Search ............................... 248/546–549, 248/67.5, 68 R, 74 R, 71, 216.1; 411/39–41, 44, 57, 537, 544–546; 174/40 CC, 157, 159, 164, 165, 166 R; 403/2; 52/98

[56] References Cited

U.S. PATENT DOCUMENTS

| 1,001,411 | 8/1911 | Jossart | 411/44 |
| 4,127,250 | 11/1978 | Swick | 248/71 |

FOREIGN PATENT DOCUMENTS

| 2105546 | 8/1971 | Fed. Rep. of Germany | 411/44 |
| 3042463 | 5/1982 | Fed. Rep. of Germany | 411/57 |

Primary Examiner—J. Franklin Foss
Assistant Examiner—Robert A. Olson
Attorney, Agent, or Firm—J. P. O'Brien; T. W. Buckman

[57] ABSTRACT

This invention relates to a block member adapted to secure a cable or wire to a support surface. The block member has a pair of cylindroconical bores with each being adapted to receive a pointed pin therethrough. Each pin has a frustoconical end with an included angle which is less than the included angle of the frustoconical portion of the cylindroconical bore. Around the open end of each bore is an impact absorbing ring. The ring is of the same material as the block member and is adapted to substantially absorb the excess energy that the tool used to drive the pins may contain by crushing on impact. The block member has each bore disposed within a freely depending sleeve to permit the axis of the pin and bore to shift, to a point where the axes could move to thereby permit the pointed end of the pin to avoid a substantially impenetrable object. There are a plurality of recesses in the bottom face of the block including a pair of recesses that are substantially parallel for positioning siamese-type coaxial cable and a recess substantially perpendicular to the parallel recesses for positioning a single coaxial cable. Contemplated by the invention is the concept of the pins being predriven to thereby minimize the need for a high energy impact to secure the block member to a support surface having lesser structural integrity.

2 Claims, 8 Drawing Figures

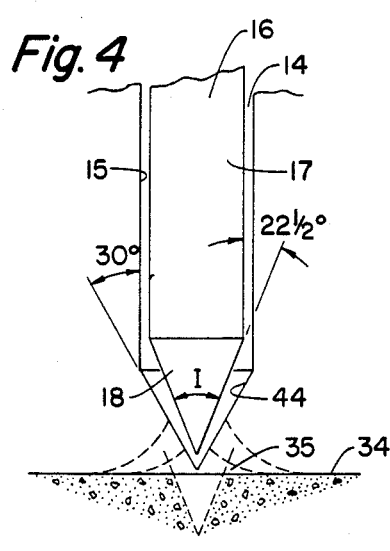
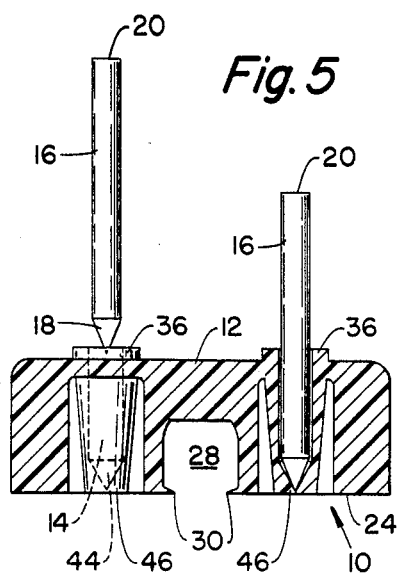
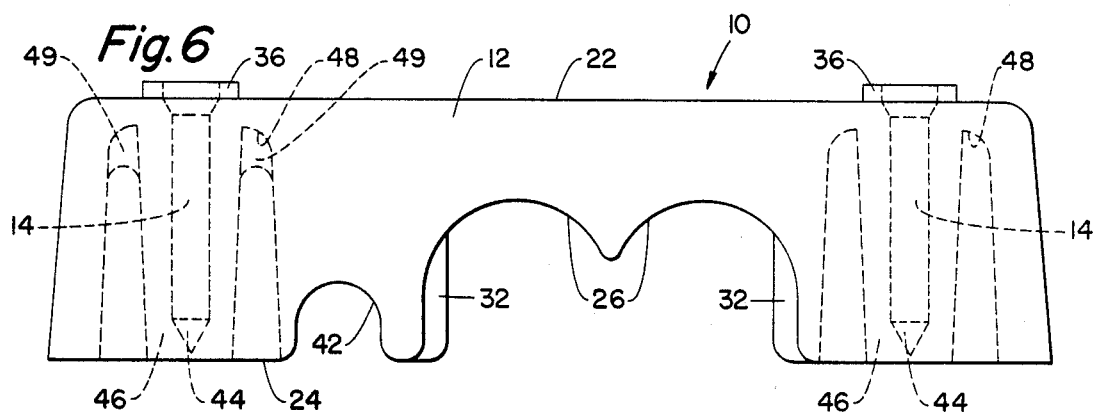
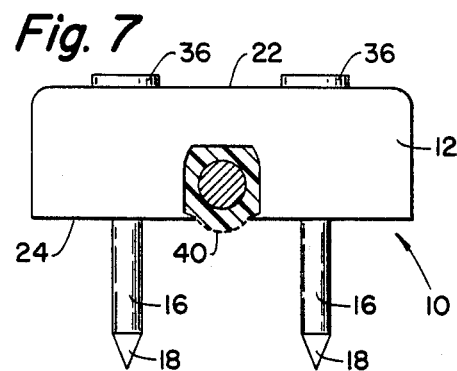
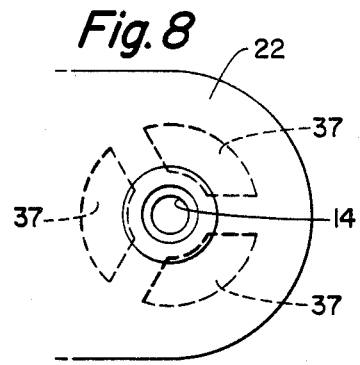

CABLE ROUTING DEVICE WITH COOPERATING PIN AND BORE

BACKGROUND OF THE INVENTION

The present invention relates generally to an improved device for clampingly securing a wire or cable to a work surface.

Clamping devices of this general type have been known and utilized with varying degrees of effectiveness. The various improvements constituting this invention were the results of attempts to overcome problems incurred by the device invented by E. Grant Swick, U.S. Pat. No. 4,127,250. That invention was assigned to and is commonly owned with this invention by Illinois Tool Works Inc. Other prior art includes the routing of cables by staples having a compressible bridge material.

Except for the device disclosed in the patent to Swick (U.S. Pat. No. 4,127,250), there are no known wire routing devices adapted to be used with many different supporting surface, including concrete. The particular problems in fastening a routing device to concrete are different from those which are encountered in fastening to surfaces which have less structural integrity. The original Swick device answered the overall problem of a universal device by providing a plastic block, of a very durable material such as Lexan polycarbonate, with a recess crossing one surface adapted to receive and clip to a wire and a pair of hardened steel pins suited to be struck by a hammer and driven into the support surface, e.g., concrete.

The set of problems that are attributable to the prior art devices include:

(1) the plastic block often being broken due to too much energy being imparted thereto by the tool used to drive the pins;
(2) the block only being capable of routing a single size of wire;
(3) the block breaking when one pin had been driven into concrete and as the second pin was driven it encountered a substantially impenetrable piece of aggregate and attempted to avoid it;
(4) the block not being seated flush with the support surface because of spalling of the concrete as the pin began its penetration with the problem being compounded by the downward extrusion of the plastic block by the pin;
(5) the block damaging the support surface when the surface is of a lesser structural integrity due to the large impacting force necessary to drive the pins through the block.

The present invention has answered the above noted problems, as will be discussed hereinafter.

SUMMARY OF THE INVENTION

The routing device of the instant invention advantageously provides:

(1) an impact absorbing ring, which crushes on impact, for absorbing the excess energy of the tool used to drive the pin;
(2) a plurality of recesses for routing of various sizes and configurations of wire and cable;
(3) a provision for permitting the point of the pin to avoid a substantially impenetrable object, e.g., a piece of aggregate in concrete;
(4) a cylindroconical bore that has a different included angle in the frustoconical portion relative to the included angle of the frustoconical portion of the pin to permit the plastic directly in line with the end of the cylindroconical bore to extrude upwardly around the pin as it is driven to thereby provide a compaction of the area of the support surface where the pin penetrates;
(5) predriving of the pins in the block with the pins being retained in the predriven condition to thereby permit attachment of the same routing device to support surfaces having lesser structural integrity, e.g., stucco or plaster, by a blow of less force then that required to drive the pins through the block and into the support surface.

It is an object of the instant invention to provide the above advantages in a novel configuration of the block.

It is a further object that the device be manufactured efficiently and economically and yet be a product that functions effectively.

Many other objects, features and advantages of the present invention will be more fully realized and understood from the following detailed description when taken in conjunction with the accompanying drawing. Note that like reference numerals are used throughout the various views to designate similar elements or components.

BRIEF DESCRIPTION OF THE DRAWINGS

A routing device constructed in accordance with this invention is described below with reference to the accompanying drawing, wherein:

FIG. 4 is a cross sectional view showing the relationship of the pin point relative to the bottom of the cylindroconical bore;

FIG. 5 is a cross sectional view showing the depending aggregate avoiders relative to a cable receiving recess;

FIG. 6 is an end view of the device of the instant invention showing the relative positions of the bores, aggregate avoiders, crushable rings, and recesses;

FIG. 7 is a side view of the embodiment of FIG. 3 showing the pins predriven relative to the block and;

FIG. 8 is a top view of a portion of the device showing a segmented annularly disposed impact absorber.

DETAILED DESCRIPTION OF THE INVENTION

Figure 1:
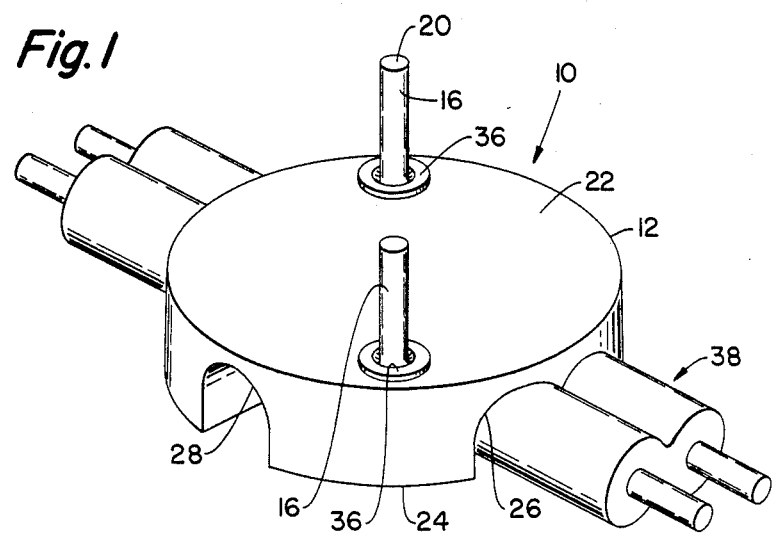
FIG. 1 is a perspective view of a routing clip of the instant invention showing a siamese cable relative thereto.
Figure 3:
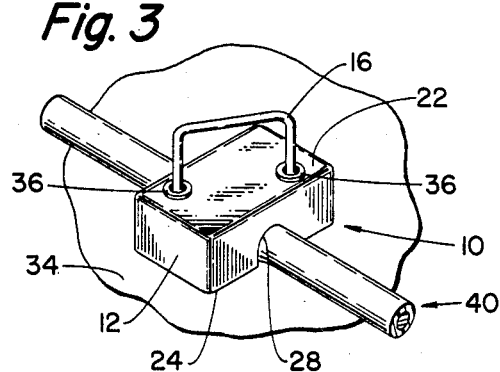
FIG. 3 is a perspective view of a rectangular embodiment of the instant invention.
Figure 2:
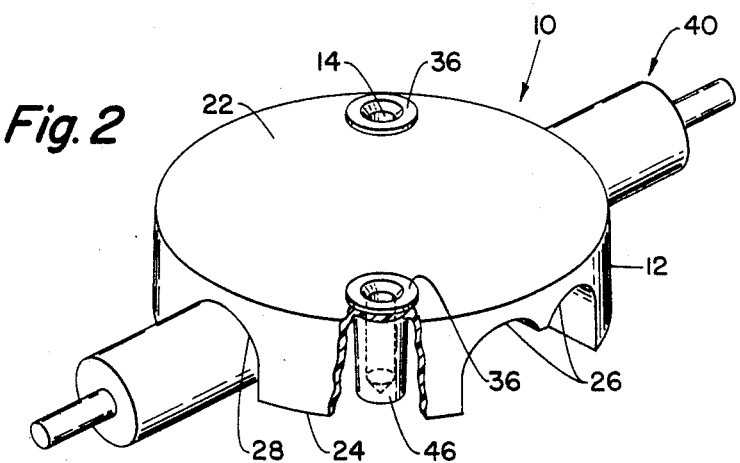
FIG. 2 is a perspective view in partial section showing the depending aggregate avoider and a single larger cable relative thereto.

Referring now to the drawings and more particularly to FIGS. 1 and 3 it will be seen that the wire routing clip assembly 10 comprises basically a block member 12 having a pair of bores 14 formed therein. The block 12 has an upper surface 22 and a lower surface 24. A pin 16, having a cylindrical portion 17 complementary in size to the cylindrical portion 15 of each respective bore 14, is aligned with and partially received in each bore 14. The pins 16 are adapted to be prepositioned so that their pointed ends 18 are received within each respective bore 14 and their end portions 20, adapted to be struck by a conventional tool, extend above the upper surface of the block. As an alternative to the straight pins (as best seen in FIG. 5) the pins may be formed as part of a U-shaped staple (as shown in FIG. 3). The block includes transversely extending recesses 26, 28, adapted to receive a cable or wire therein. The recesses are preferably positioned between the bores for reasons which become apparent from the following in depth disclosure. The block as shown in FIGS. 1 and 2 are particularly well suited for routing of cables of different sizes or configurations wherein the routing device as depicted in FIG. 3 is shown as being suited for routing of a single cable of a particular size. It being understood that the rectangular block may have a similar arrangement of recesses 26, 28 therein and vice versa.

The recesses 26, 28 extend transversely across the entire width of the block 12 and preferably have restricted openings, as best seen as being protrusions 30 in FIG. 5, to aid in preassembling of the clip to a cable prior to the installation of the routing device on a support surface. Each recess ideally includes a strain relief 32 to aid in positioning of the cable relative to the support surface 34 by resisting movement of the cable along its longitudinal axis.

As best seen in FIGS. 1, 2, and 3, the routing device includes an annular, crushable, impact absorbing ring 36 disposed on the upper surface 22 of the block 12 and protruding upwardly therefrom. The impact absorbing protrusions 36 are positioned about the open end of each bore 14 and are integrally molded with the block member 12. Each impact absorber 36 is adapted to be crushed upon heavy impact and substantially absorb the excess force that a conventional tool may have when it is used in driving the pins 16. It is contemplated by the invention that the impact absorbing protrusions 36 may take many different forms including a continuous annular ring (as shown as 36 seen in FIGS. 1–3), a segmented annular ring 37 (shown in FIG. 8), as well as protrusions in the form of dimples, etc.

Referring now to FIGS. 1, 2 and 6, there is shown a number of shapes and sizes of transversely extending recesses 26, 28 in the block member 12 which permits the selection of wires of different sizes to be routed relative to a support surface 34. It can be seen in FIG. 1 that there are parallel transverse recesses 26 particularly adapted to route a siamese type cable 38 or in the alternative a pair of single cables side by side and as seen in FIG. 2 there is a single recess 28 for routing a single coaxial type cable 40. The recess 28 is shown as being substantially perpendicular relative to the parallel pair of transversely disposed recesses 28. While the angle of intersection of the recesses 26, 28 may vary, the critical feature is that the recesses 26, 28 be positioned between the pair of bores 14. Referring to FIG. 6, here it can be seen that the parallel transverse recesses 26 are in communication with one another for receiving the siamese type cable 38. Parallel to but spaced from these recesses 28 is a smaller transverse recess 42 for much smaller cable or wire. It should be readily apparent from this that the recesses may take any size or configuration as needed to accommodate a particular wire or cable. Referring again to FIG. 5, the recesses could include, as an option, inwardly directed extensions 30 for engaging and retaining the wire relative to the block member.

Referring now to FIG. 4, it can be seen that each of the pins 16 are of a cylindroconical configuration wherein the pointed end 18 is frustoconical and each frustoconical portion 18 of each cylindroconical pin 16 has an included angle I which is about 45 degrees and preferably in the range of 40 to 50 degrees. Each bore 14 in the block member 12 is also of a cylindroconical configuration, but has a frustoconical portion 44 with an included angle which is substantially larger than that of the frustoconical portion 18 of the pin 16. Generally the included angle of the frustoconical portion of the bore is in the range of 60 degrees. The advantage of such an arrangement is that when the lower surface of the block member 12 is juxtaposed a support surface 34, e.g., concrete, and the pin 16 is impacted and driven through the end of the cylindroconical bore 14 into the support surface 34, it will be seen that the material, of which the block member 12 is formed, cooperates with the point 18 to form a positive compaction of the surface 34 in the area 35 in which the pin point 18 penetrates. When the included angle of the pin point 18 is less than the included angle of the frustoconical portion 44 of the cylindroconical bore 14 the initial compaction of the support surface 34 occurs in the immediate area of the very end of the pin point 18. Compaction generally increasing in a radially concentric manner relative to the point of initial compaction to thereby control spalling of the support surface 34. If the included angles are equal a less desirable effect is achieved due to the material directly in line with the end of the bore being driven downwardly at too great a rate causing the device to be forced away from the surface. The arrangement disclosed by the instant invention provides for a very tight fit of the block member 12 relative to the support surface 34.

As the pointed end 18 of the drive pin 16 enters the concrete surface 34, it causes the concrete to fracture. The continued downward motion of the drive pin 16 causes the lower surface of sleeve 46 to be pressed against the loose concrete in the region 35 (FIG. 4). This downward compressive force on region 35 compacts the concrete surface 34 to prevent spalling of the concrete region 35. As the pin is continued to be driven downwardly, the plastic about the frustoconical portion 44 is extruded upwardly around the pin point 18 to fill in the space between pin point 18 and frustoconical portion 44 of the cylindroconical bore 14. It is the constant downward compression force exerted by the lower surface of sleeve 46 that prevents spalling of the concrete as the pin point 18 penetrates concrete surface 34. By virtue of this interaction between the frustoconical portion 44 and concrete surface 34, the pin 16 is caused to be held in retention along the entire portion of the pin that extends into the concrete surface. This holding force is substantially greater than all known prior art devices.

Referring now to FIGS. 2 and 5 it can be seen that the cylindroconical bore 14 is contained within a depending sleeve member 46. The block member has an upper wall 48 from which the sleeve member depends and with which the sleeve member 46 is integrally formed. The sleeve member 46 is adapted to be flexed at its point of attachment to the upper wall 48 to permit the longitudinal axis of the pin 16, received in the cylindroconical bore 14, and the sleeve member 46 to shift to a point along which the axis would be able to move. The flexing is accomplished by the inherent flexibility of the material around the sleeve member attachment to wall 48 of the body portion 12. The advantage being that on installation of the routing device 10 on a support surface 34, such as concrete, where one of the pins 16 is driven into the support surface 34 and the other pin 16 is subsequently driven and strikes a substantially impenetrable object, e.g., a piece of aggregate, the pin point will be permitted to attempt to avoid the aggregate. Such an arrangement permits the pins 16 to no longer be parallel when driven thereby preventing breakage of the block 12 which would otherwise occur due to stresses imparted thereto if the block 12 were solid. It is contemplated by this invention that the sleeve 46 may be continuous in nature or segmented. A segmented sleeve would, if needed, permit greater deflection of the longitudinal axis at the lower end thereof due to the fact that only a segment of the sleeve would need to be deflected when the axis shifts.

A segmented sleeve, which has individual depending sleeve segments (not shown) may be maintained in a predetermined pattern by a frangible ring (not shown) at the lower end. As a pin 16 is driven through the ring it would, ideally, break, thereby releasing the individual segments and permitting a greater degree of shifting of the axis while being able to positively maintain a pin 16 in a partially predeiven position. This segmented sleeve arrangement results in a substantial reduction in the stress in the area where the sleeve is attached to the lower side of the upper wall 48 of the body portion 12.

Referring now to FIG. 7 it can be seen that the pins 16 in this instance have been predriven relative to the block member 12 and that a cable 40 has been preassembled in the transverse recess 28. The routing device 10 of the instant invention, as seen here, can be used with support surfaces 34 that have a structural integrity which is substantially less than that of concrete. A typical problem encountered in installing devices of this type on plaster or stucco is that the energy necessarily impacted on the end 20 of the pin 16 to drive it relative to the block 12 is substantial and more than enough to damage the support surface 34. By predriving the pins 16 it can be seen that a nominal impact is necessary to drive the pins relative to support surface of a material such as plaster. When the clip 10 is used in this particular configuration the impact absorbing rings 36 cooperate with the aggregate avoider sleeve 46 to permit the pins 16 to be driven and splay as necessary within the support surface while preventing damage to the surface of the block 12 and the support surface 34. The method of using such a device thus entails the predriving of the pins 16 relative to the block 12, the attachment of the block 12 to the cable 40, the positioning of the device relative to the support surface 34 and the driving of the pins 16 into the support surface 34 by impacting the block in the general region of the impact absorbing rings 36 and ends 20 of the predriven pins 16.

Accordingly, this invention provides a simple and efficient wire clamping and routing device for securement of wire and cable to a support surface. The advantages clearly being that damage to the block is substantially precluded by the impact absorbing ring, the ability of the block to route cables or wires of various sizes and configurations, and the ability of the device to be used on a support surface that has substantially impenetrable particles or objects therein. The method of predriving the pins and utilization of the block relative to a support surface of a lesser structural integrity is clearly an advantage to workmen in that the repair to damaged surfaces will be substantially eliminated.

While specific embodiments of various aspects of the invention have been disclosed it will be understood that variations and modifications thereof may be affected without departing from the spirit and scope of the novel concepts disclosed and claimed herein.

I claim:

1. A clip for fastening an elongated article onto a support surface made of concrete or like material, comprising a metallic pin and a plastic body portion including a first side adapted to engage said support surface and a second substantially exposed side, a recess formed in said first side completely traversing said first side in a predetermined direction, and at least one cylindroconical bore formed in said plastic body portion at one side of said recess, said cylindroconical bore including a frustoconical portion adjacent said first side, said metallic pin being substantially cylindroconical with a frustoconical end portion and being disposed within said at least one bore, said frustoconical portion of said metallic pin having an included angle less than the included angle of said frustoconical portion of said bore.

2. A clip as defined in claim 6, wherein said frustoconical portion of said bore is approximately 60 degrees and said frustoconical portion of said metallic pin is in the range of 40 to 50 degrees.

* * * * *